Oct. 17, 1967  F. CELORIO MENDOZA  3,347,177
MACHINES FOR PREPARING FOOD PRODUCTS FROM DOUGH
Filed Sept. 15, 1964  5 Sheets-Sheet 5
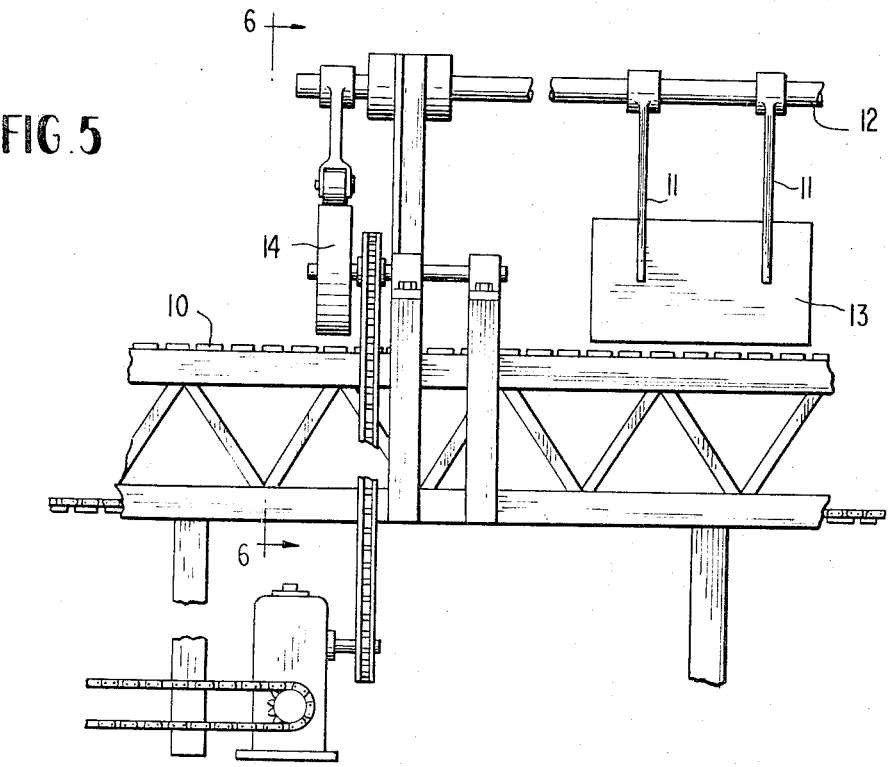
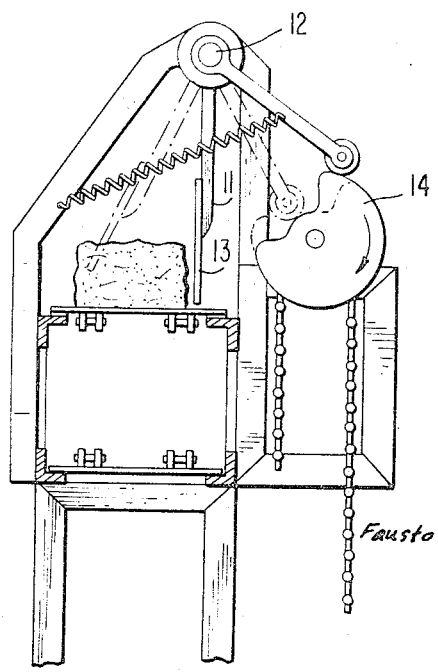
Fausto Celorio Mendoza INVENTOR.
BY Ogle R. Singleton
ATTORNEY 3,347,177
MACHINES FOR PREPARING FOOD PRODUCTS FROM DOUGH
Fausto Celorio Mendoza, Mexico City, Mexico
(Calzada San Esteban 57, Naucalpan, Mexico)
Filed Sept. 15, 1964, Ser. No. 396,642
6 Claims. (Cl. 107—14)

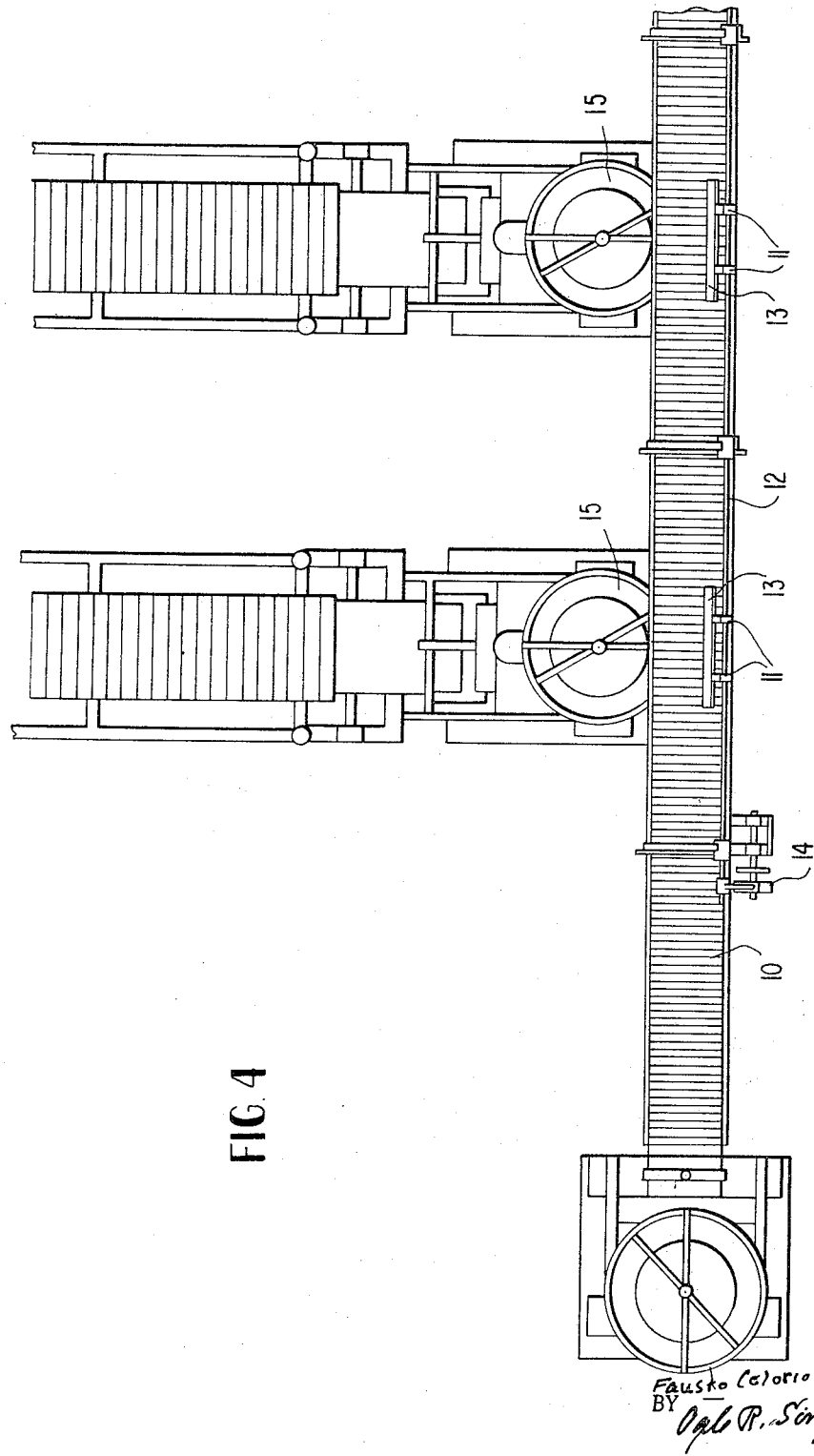

My invention consists in a new and useful improvement in machines for preparing food products from dough, especially corn or wheat dough, and more particularly it is related to a novel machine for proportioning accurately measured and controlled amounts of dough.

In machines for the production of dough cakes or "tortillas" from corn dough, there are generally one or more dough forming machines which are molding machines requiring a constant and accurately controlled supply of dough to their feed bin, in order to produce molded food articles from the dough, in a perfectly smooth and non-interrupted way.

Therefore, up to date, it has been a problem in this type of facilities that is required to have a worker contantly attending the molding machine in order that the necessary supply of dough will not fail therein, and in order to get a uniform production of the food molded articles. This, of course, is very costly, inasmuch as labor is generally costly, so that it has been for a long time in this type of automatic facilities, sought to provide means for supplying dough in accurately measured portions, and at suitable times, so that the material will never fail in the feed bin of the molding machine, thus avoiding failure in production, or excessive cost in the control thereof, because of the difficulty in the control of the feeding of dough to the machine.

In view of the above, it is a main object of the present invention to provide a dough proportioning machine in which production or throughput of this material can be regulated at will.

Another object of the present invention is to provide a dough proportioning machine including suitable means for varying the output of dough therefrom and means for cutting it into lumps of constant and specified size, to feed one or more molding machines.

An additional object of the present invention is to provide a machine which will function in a fully automatic manner and without labor in the handing of the dough or conveying it.

Another object of the present invention is to provide a machine wherein easily adjustable means are provided to vary the output of dough by varying the bulk of individual pieces and/or by providing different feeding speeds, in this machine, toward one or more dough molding machines.

Other and additional objects and advantages of the present invention will be apparent and still others will appear as the specification proceeds, taken in connection with the accompanying drawings, wherein:

FIG. 4 is a top plan of a machine built in accordance with the present invention in combination with a conveyor and pushing apparatus for discharging measured amounts of dough into two molding machines which are illustrated in plan in this figure;

FIG. 5 is an elevational, fragmentary view of the pushing apparatus according to the present invention, to be used in combination with the dough proportioning machine; and FIG. 6 is a section on line 6—6 of FIG. 5.

Figure 1:
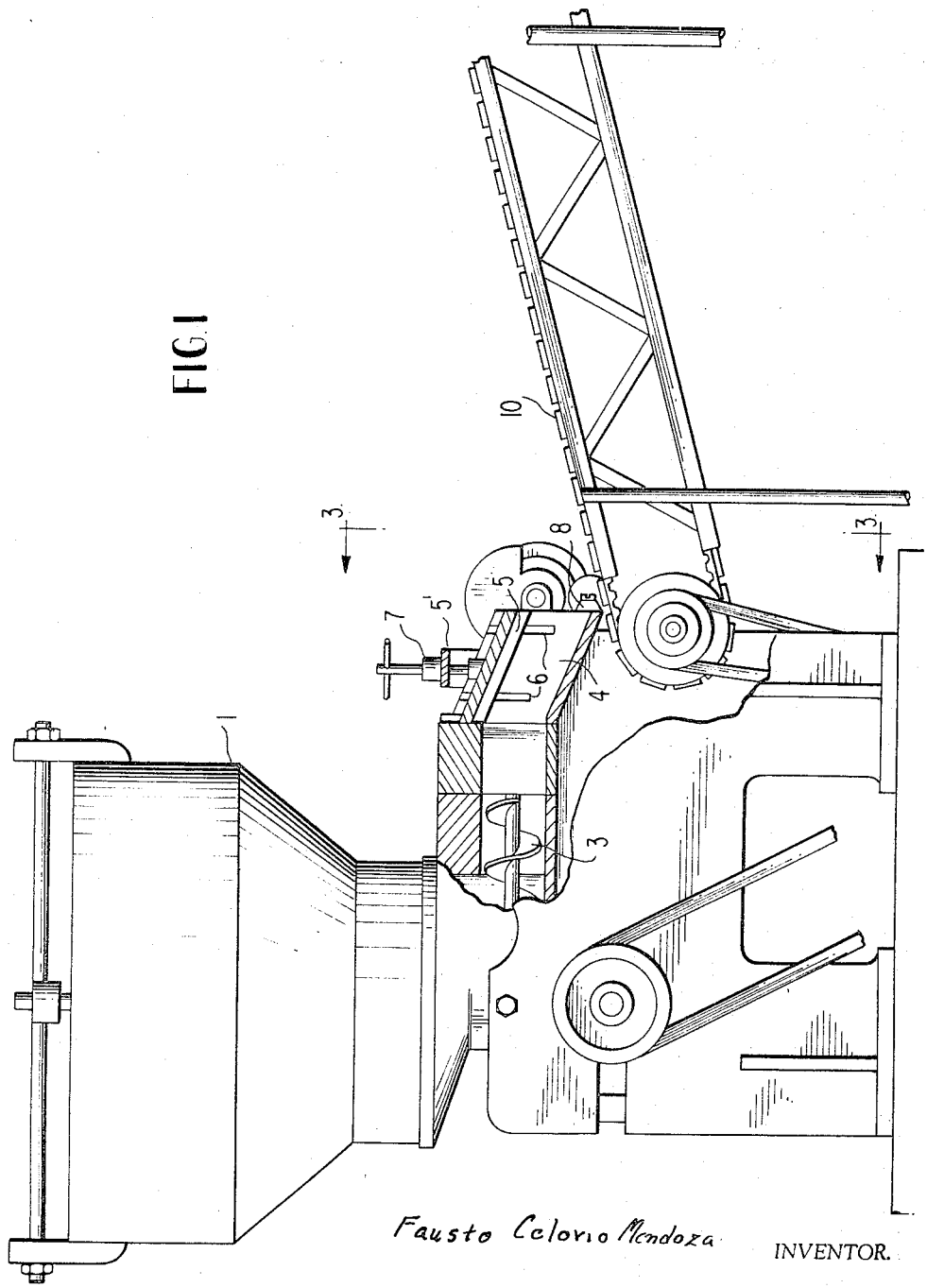
FIG. 1 is an elevation, partially in cross-section.
Figure 2:
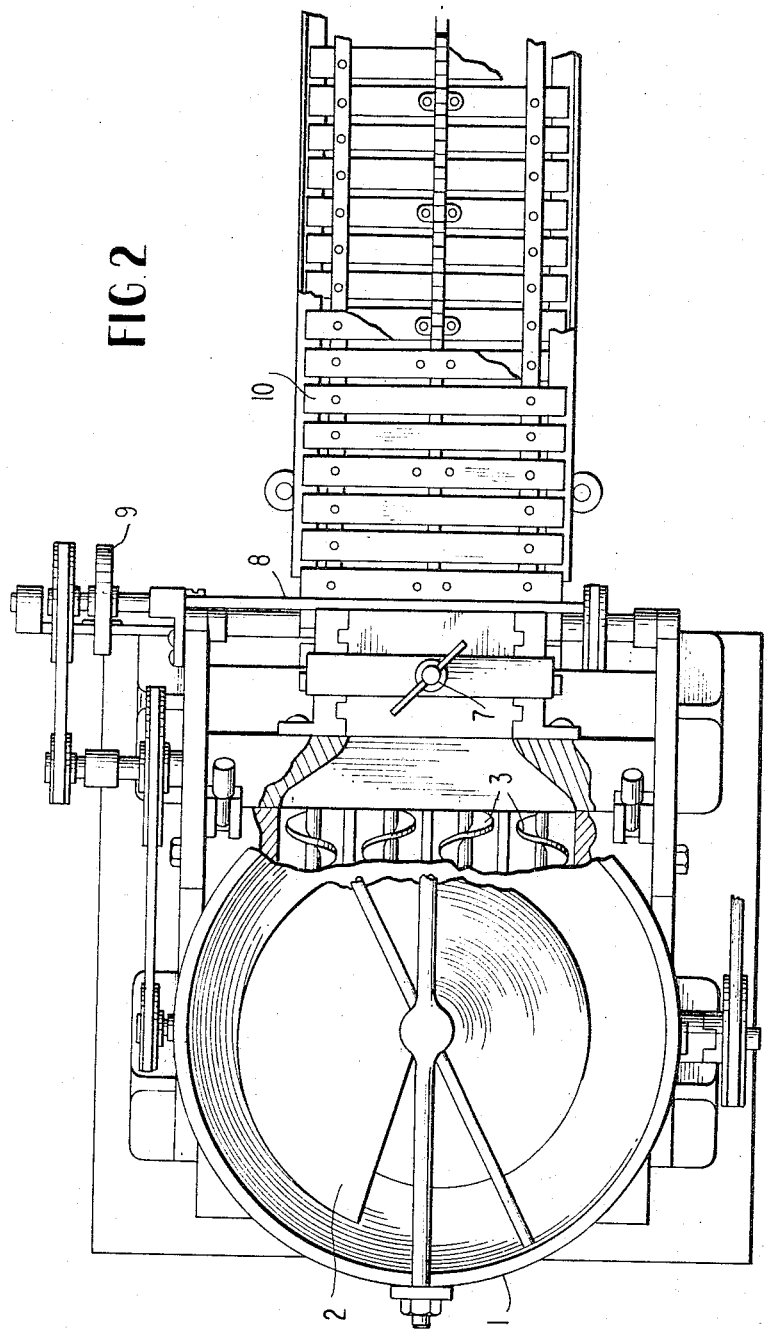
FIG. 2 is a top plan, partly in cross-section.
Figure 3:
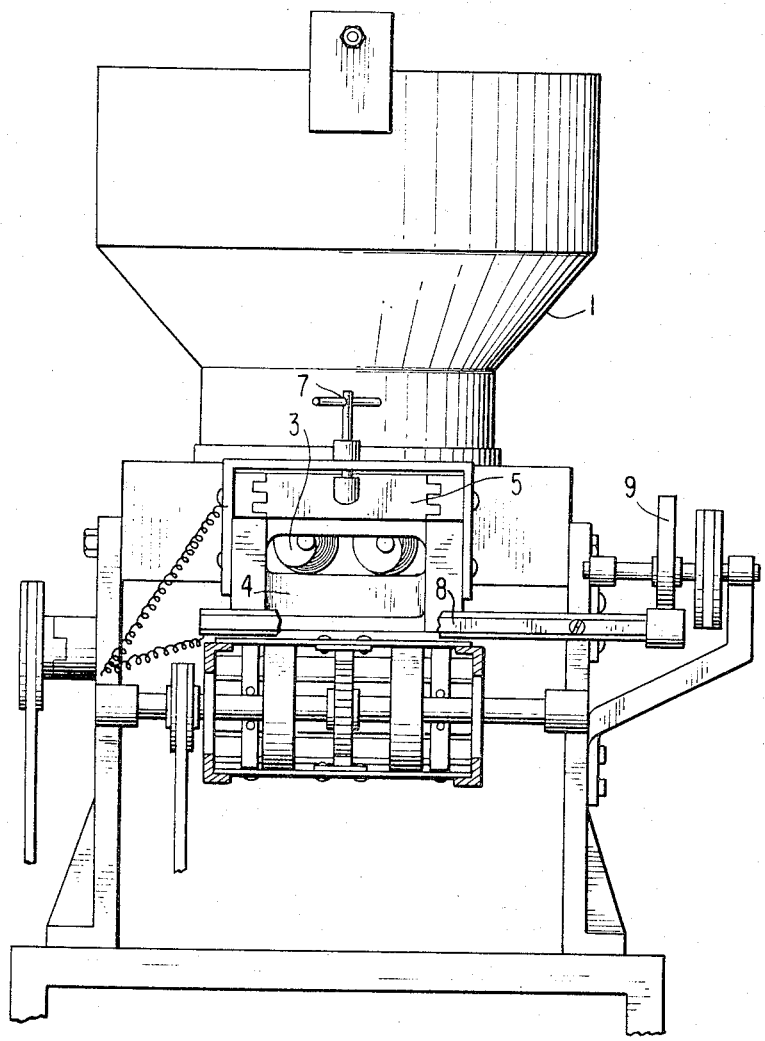
FIG. 3 is front elevation of the machine illustrated in FIGS. 1 and 2, partly in cross-section, on the line 3—3 of FIG. 1.

Having more particular reference to the drawings and more specifically to FIGS. 1 to 3 thereof, a proportioning machine is shown, which is specially suitable for dough, particularly corn dough produced by a mill, which is delivered by means of a suitable conveyor, not shown in the drawings, within a hopper or bin 1, for proportioning in the form of blocks of dough for a plurality of molding machines.

This machine comprises a frusto-conical vessel or charge bin 1 wherein a system of paddles 2 rotate, forcing the dough to descend in order to be taken by a gang of worms 3 which are horizontally disposed at the lower portion of the bin 1 and which convey the dough at a constant pressure in order to force it out from a nozzle 4. The nozzle 4 comprises a generally downwardly sloping channel which is provided with a liftable plate 5. A bracket 5' is fastened to the outer walls of the nozzle 4, and extends across the top of this nozzle to provide a stop for upward movement of the liftable plate 5. Generally the liftable plate 5 is sufficiently thick that at its uppermost position it still will cover the width of the channel forming the nozzle 4, thus preventing dough from escaping the channel and forcing all the dough driven by the worms 3 to go out through the nozzle 4 formed by the lower surface of the liftable plate 5 and the inner surfaces of the channel portion of nozzle 4.

The liftable plate 5 is generally mounted obliquely and is provided with dovetailed ends so that it may run vertically between trackways 6 which allow it to move up and down, and is actuated by a screw and wheel system 7, in order to provide variations in the cross-sectional area of the nozzle 4, by means of the ascent or descent of the plate 5, and hence control of the volume of dough discharged through the nozzle 4 of the machine. To this end, the liftable plate 5 is provided with suitable bushings or other means for reception of the lower end of the screw.

The system of conveyor worms 3 assures a flow of dough at constant outlet speeds, in view of the correspondingly constant speed of rotation of the worms.

Adjacent the outlet end of the nozzle 4, a knife 8 is provided to reciprocate vertically at timed intervals, in order to shear the dough discharged through the nozzle 4, whereby to obtain equal portions of dough in the form of blocks synchronized with the operation of the molding machines. Reciprocation of the knife 8 may be provided for in any convenient manner. For example, knife 8 may be fastened to the frame which supports the hopper 1 by means of a single fastener, as shown in FIGURE 3, near to the cam 9 to allow the knife 8 to fulcrum around this fastener. Rotation of the cam 9 in a clockwise fashion in the view of FIGURE 1 will cause downward pressure on a cam follower attached to the short lever arm portion of the knife. Depression of this follower and the short lever arm portion of the knife 8 causes upward movement of the long lever arm portion of the knife past the outlet of the nozzle 4. A spring fastened to the long lever arm portion of knife 8 may serve both to hold this portion against the nozzle outlet and to cause downward movement of this portion when pressure from the cam 9 on the short lever arm portion is released.

The blocks of dough fall on a conveyor belt 10 which is arranged in such a way that it will extend completely under the outlet from nozzle 4, in order to avoid any portion of dough falling under to machine. The conveyor belt 10 is of conventional type, preferably formed by links attached to separate cross strips, and is driven by suitable mechanical drives which drive the conveyor in the longitudinal direction, at a speed higher than the speed of the extruded material leaving the nozzle, in order that when the knife cuts the blocks from the extruded material, the blocks will be discretely spaced apart, one from the other.

FIGS. 5 and 6 of the drawings clearly illustrate portions of the said conveyor belt 10, at suitable places where the pushing or discharging devices are to be found, in order to push from the belt 10 the dough blocks formed by the proportioning machine, and which are arranged in combination therewith, and timed with the motion thereof in order to push, at proper intervals of time, the dough blocks outwardly of the belt 10, so that said blocks will fall, according to the very clear illustration of FIG. 4 of the drawings, into the charging bins 15 of one or more molding machines, for instance dough cake making machines or the like, which are arranged in such a way that a part of the mouth of said bin is under one of the side edges of the belt 10.

The conveyor belt 10 is provided, at its top, as clearly shown in FIGS. 5 and 6 of the drawings, with one or more swinging arms or levers 11, integral at their upper ends with a shaft 12, and at their lower ends with corresponding pusher plates 13 in such a way that by the swinging motion thereof they push out from one edge of the belt 10 the dough blocks formed by the proportioning machine, and charge them into the bins 15 of the molding machines.

The shaft 12 which carries the swinging levers 11 is provided with a swinging motion at timed intervals, which is achieved by the action of a cam mechanism 14, which is driven by the same element which drives the cam 9 which governs the motions of knife 8 for example, a variable speed motor connected by belts, pulleys, etc., to the shaft which carries cam 9 (see FIGURE 2) and connected by an endless chain and gear-box, located under the conveyor belt 10, to the cam 14 (see FIGURE 5). The fact that the cam 14 is moved through positive conventional drives by the same driving means moving the cam 9 brings about automatic coordination of the timing of motion of knife 8 and levers 11 for pushing plates 13, whereby to assure that the dough blocks transported by the belt 10 will be pushed simultaneously in the exact moment when they are passing said plates 13 in order to feed in a constant and uninterrupted way to the molding machines, for instance dough cake molding machines which are arranged in combination with the proportioning machine of the present invention.

While the invention has been described and illustrated in terms of one preferred embodiment thereof, it must be understood that it is not intended to be limited to said embodiment, but that the present invention can be subject to variations and modifications without thereby departing from the scope thereof. Therefore, it is intended that the present invention be only limited according to the scope of the following claims.

Having described my invention, what I claim is:

1. In a system for use with material having a self-sustaining dough-like consistency comprising, in combination, a proportioning machine and a molding machine for said material spaced at an interval from said proportioning machine with a conveyor therebetween, said proportioning machine comprising a charging bin with an outlet arranged at the lower part of said bin, means for driving said dough-like material from said outlet to a nozzle and a cutting knife, held adjacent the outlet of said nozzle, and being actuatable by a cam having a rotary motion to produce timed vertical strokes, one portion of said conveyor passing underneath said nozzle in position to receive blocks of dough-like material extruded by said nozzle and cut by said knife, said conveyor being provided, in a portion adjacent said molding machine, with a pushing device in order to push said blocks into said molding machine, the improvement which comprises a single means for driving means for both said reciprocating knife and for said pushing device to assure unloading of the said conveyor in a timed relationship with the cutting.

2. The system of claim 1 in which the nozzle has an upper wall comprising a liftable plate, adjustable to be moved upwardly and downwardly, running through suitable trackways, in order to vary the cross-section of the outlet from said nozzle and, consequently the volumetric production of said proportioning machine.

3. A system according to claim 2, where said liftable plate of the nozzle is arranged in such a way that its upper surface is provided with a bushing permitting free rotation of a stem therewithin, said stem being threaded and passing through a correspondingly threaded bracket, and being provided at its upper end with a suitable wheel to enable it to be turned and thereby producing the upward and downward motion of said liftable plate.

4. A system according to claim 2, wherein said conveyor belt is provided with driving means which drive it in the longitudinal direction, at a speed higher than the speed of the extruded material leaving said nozzle, in order that when said knife cuts the blocks from said extruded material, said blocks will be discretely spaced one from the other.

5. A system according to claim 2 in which said pushing device comprises a pusher plate carried by a pair of swinging levers, integrally attached at their upper ends to a shaft, said shaft being attached at one of its ends to one end of a crank arm having a cam follower at its opposite end.

6. A system for use with material having a self-sustaining dough-like consistency comprising, in combination,
   (A) a proportioning machine comprising
      (i) a charging bin with an outlet arranged at the lower part of said bin,
      (ii) means for driving said dough-like material from said outlet to a nozzle,
      (iii) said nozzle having an upper wall comprising a liftable plate adjustable to be moved upwardly and downwardly, running through suitable trackways, in order to vary the cross-section of the outlet from said nozzle and consequently the volumetric production of said proportioning machine,
      (iv) and a cutting knife, held adjacent the outlet of said nozzle, and being actuatable by a cam having a rotary motion to produce timed vertical strokes;
   (B) a plurality of molding machines for said material spaced at intervals from each other and from said portioning machine;
   (C) a conveyor
      (i) passing underneath said nozzle in position to receive blocks of dough-like material extruded by said nozzle and cut by said knife,
      (ii) extending to said molding machines and
      (iii) provided adjacent each molding machine with a pushing device in order to push, one at a time, said blocks into their adjacent molding machine,
      (iv) each said pushing device comprising a pusher plate carried by a pair of swinging levers, integrally attached at their upper ends to a shaft, said shaft being attached at one of its ends to one end of a crank arm having a cam follower at its opposite end; and
   (D) a single drive means for both the said cam which operates said knife and a cam which operates said cam follower to assure unloading of the said conveyor in timed relationship with the cutting.

References Cited

UNITED STATES PATENTS

| | | | |
|---|---|---|---|
| 616,401 | 12/1898 | Callaway | 25—17 |
| 1,433,471 | 10/1922 | Ojeda | 107—14.2 |
| 2,018,057 | 10/1935 | Donner | 198—24 X |
| 2,428,722 | 10/1947 | Palmer | 198—24 |
| 2,613,618 | 10/1952 | Sharp et al. | 107—14.1 |
| 2,760,447 | 8/1956 | Mendoza | 107—14.4 |
| 2,953,461 | 9/1960 | Prohaska. | |

WILLIAM I. PRICE, *Primary Examiner.*

WALTER A. SCHEEL, *Examiner.*

J. SHEA, *Assistant Examiner.*